United States Patent [19]
Feldstein

[11] Patent Number: 5,523,668
[45] Date of Patent: Jun. 4, 1996

[54] NICD/NIMH BATTERY CHARGER

[76] Inventor: Robert S. Feldstein, 4 Clinton Ave., Dobbs Ferry, N.Y. 10522

[21] Appl. No.: 228,393

[22] Filed: Apr. 15, 1994

[51] Int. Cl.$^6$ .......................... H01M 10/44; H01M 10/46
[52] U.S. Cl. .................. 320/6; 320/15; 320/23; 320/24
[58] Field of Search ................. 320/19, 22, 23, 320/24, 6, 15

[56] References Cited

U.S. PATENT DOCUMENTS 5,291,116  3/1994  Feldstein ...................... 320/22 X
5,329,219  7/1994  Garrett ............................. 320/22
5,350,996  9/1994  Tauchi ............................. 320/22

Primary Examiner—Peter S. Wong
Assistant Examiner—Edward Tso
Attorney, Agent, or Firm—Howard M. Cohn

[57] ABSTRACT

A battery charging system and method of operating the system is provided which can charge either NiCd and/or NiMH batteries with significant permanent recombinant capacity sufficient to permit cell charge completion, as well as charge maintenance, in an acceptable period of time.

29 Claims, 5 Drawing Sheets

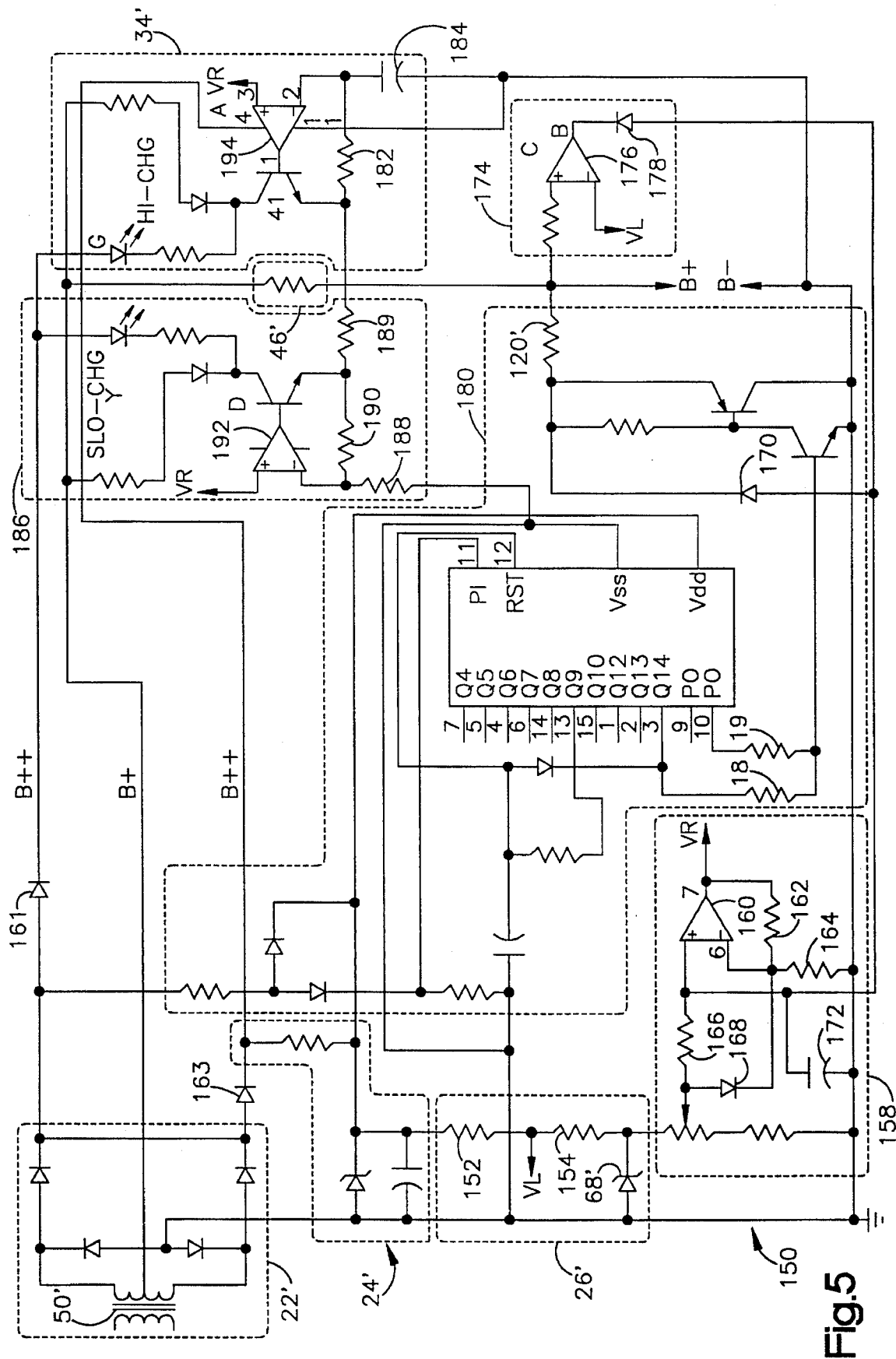

NICD/NIMH BATTERY CHARGER

CROSS-REFERENCE TO RELATED APPLICATION

This application is related to U.S. application Ser. No. 08/228,874, filed, by Robert Feldstein for COMPOUND BATTERY CHARGE SYSTEM and U.S. application Ser. No. 08/228,341, filed by Robert Feldstein for MAGNETICALLY BALANCED MULTI-OUTPUT BATTERY CHARGING SYSTEM.

FIELD OF THE INVENTION

This invention relates to the field of battery charging. More particularly, the invention is directed to an apparatus and method for fully recharging a NiCd (nickel cadmium) or NiMH (nickel metal hidride) cell or battery or system of batteries.

BACKGROUND OF THE INVENTION

The design of a charger for any cell or group of cells is always a compromise between the requirements for the intended use and the characteristics of the battery. Even the definition of rechargeability depends on the specific application. For example, a device which discharges a moderate capacity battery at a moderate rate, such as a portable radio or tape player, could be powered by ordinary alkaline zinc manganese dioxide cells. While these cells are generally not considered rechargeable, it is possible to charge them with a special purpose, sophisticated battery charger.

NiCd cells are preferred in applications requiring relatively high discharge rates after prolonged charging at elevated temperature, as in fluorescent emergency lights. Chargers are presently available to charge NiCd batteries. However, NiCd batteries are toxic and there use is being restricted by law. Moreover, battery chargers which are capable of charging NiCd batteries cannot charge NiMH batteries.

NiMH cells are often selected where capacity per unit weight or volume, rather than peak power or disposal safety, are critical. These cells can be charged by presently available battery chargers. However, battery chargers which are capable of charging NiMH cells are generally not appropriate for charging NiCd cells and vice versa. As NiCd batteries are phased out, electronic devices such as portable computers can use two different types of batteries, i.e. NiCd and NiMH. However, the same battery charger typically can not charge both. Further, if one type of battery were placed in a charger suitable for the other type of battery, the battery and possibly the charger itself would be damaged. Since these batteries are relatively expensive, it is desirable to prevent such an occurrence. Moreover, it would be highly desirable to provide a single battery charger which could effectively charge both NiCd and NiMH batteries interchangeably.

OBJECTS AND SUMMARY OF THE INVENTION

It is an object of the present invention to battery charging system and method of operating the system which obviate the problems and limitations of the prior art systems.

It is an object of the present invention to provide a battery charging system and method of operating the system which is suited for NiCd and/or NiMH batteries.

It is a further object of the present invention to provide a battery charging device and method of operating the system that provides recharging current that varies with state-of-charge and programmed time schedule imposing both long and short duration discharge.

Yet another object is to provide a battery charging system and method of operating the system which can charge batteries with significant permanent recombinant capacity sufficient to permit cell charge completion, as well as charge maintenance, in an acceptable period.

In accordance with the invention, a novel multi-stage charging system can charge batteries with significant permanent recombinant capacity sufficient to permit cell charge completion, as well as charge maintenance, in an acceptable period. For example, either NiCd or NiMH batteries, taken alone or in combination, can be charged by the same charging system. The charging system is unique because of its flexibility, utility, and specific set of recharge priorities.

The charging system of the present invention is well suited for NiCd and NiMH batteries because of their relatively fast recharge rates. The cells of these batteries are capable of accepting a substantial charging current in the uncharged state, to justify the complexity of the novel, multi-stage, charging system. For example, the initial charge rate limit can be in the range of 3C to 10C for sealed NiCd cells and up to about 1C for NiMH. NiCd batteries accept recombinant currents from C/20 in large sealed standard cells to as high as C/3 in small, "high-temperature" sealed cells NiMH batteries typically accept recombinant currents of C/40 permanently.

In accordance with the invention, a battery charging system for and the method of independently charging NiCd and/or NiMH batteries comprises a device for independently charging each of the batteries to a first reference voltage of up to about 1.40 V/cell at a temperature of 25° C. with a fast charging current; means are included for independently charging each of the batteries from the reference voltage of about 1.40 V/cell to a second reference voltage of about 1.48 V/cell at a temperature of 25° C. with a slow charging current; and means for independently charging each of the batteries above the second reference voltage with a trickle charging current.

According to the invention, the battery charging system includes a base unit providing supply voltages and a plurality of individual charge control units, one for each of the plurality of batteries. The individual charge control units provide the fast charging current by adding charging currents from first, second, and third sources of charging current. The individual control units provide the slow charging current by adding charging currents from the second and third sources of charging current. Further, the individual charge control units provide the trickle charging current from the third source of charging current.

Further in accordance with the invention, the base unit further includes means to produce short and long discharge pulses independently from the batteries, wherein the short and long discharge pulses are separated by varying periods of time. The base unit further includes means for stopping the charging of the batteries with the fast and slow charging currents whenever the long discharge pulses are produced from the batteries and means to vary the first and second reference voltages depending on variations in temperature.

In accordance with an additional embodiment of the invention, a battery charging system for charging a string of serially connected NiCd and/or NiMH cells and method of operating the system comprises means for charging the string of cells to a first reference voltage of up to about 1.40 V/cell at a temperature of 25° C. with a fast charging current; means for independently charging the string of batteries from the voltage of about 1.40 V/cell to a second reference voltage of about 1.48 V/cell at a temperature of 25° C. with a slow charging current; and means for independently charging the string of cells above the second reference voltage with a tickle charging current. Means are also provided for stopping the charging of the string of cells with the fast and slow charging currents whenever the voltage across the string of cells is below a low reference voltage.

According to the additional embodiment, the fast charging current is the added charging currents from first, second, and third sources of charging current; the slow charging current is the added charging currents from the second and third sources of charging current; and the trickle charging current is the charging current from the third source of charging current.

The additional embodiment also includes means to produce short and long discharge pulses from the string of cells, wherein the short and long discharge pulses are separated by varying periods of time; means for stopping the charging of the string of cells with the fast and slow charging currents whenever the long discharge pulses are produced from the string of cells; and means to vary the first and second reference voltages depending on variations in temperature.

BRIEF DESCRIPTION OF THE DRAWINGS

The structure, operation, and advantages of the presently preferred embodiment of the invention will become further apparent upon consideration of the following description taken in conjunction with the accompanying drawings, wherein:

FIG. 5 is a schematic diagram of the battery charger system of FIG. 4.

DETAILED DESCRIPTION OF THE INVENTION

Figure 1:
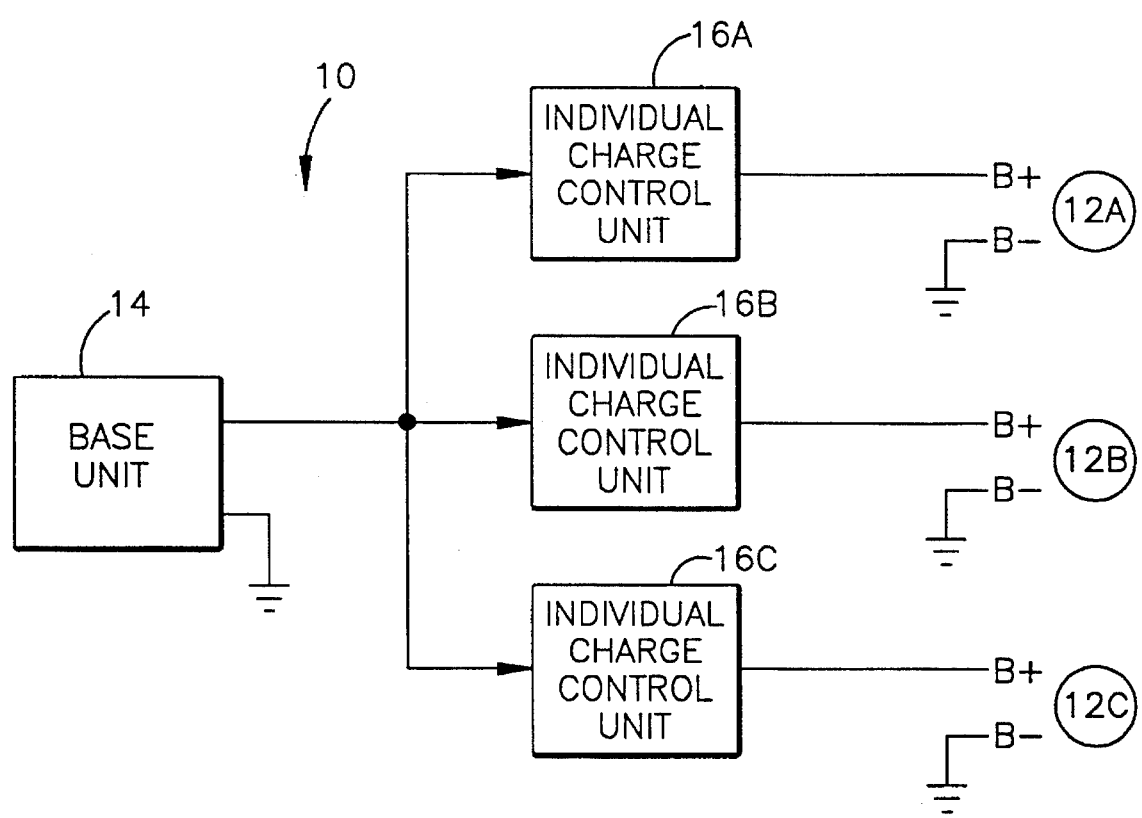
FIG. 1 is a block diagram of an "individually regulated" battery charging system in accordance with the invention.
Figure 2:
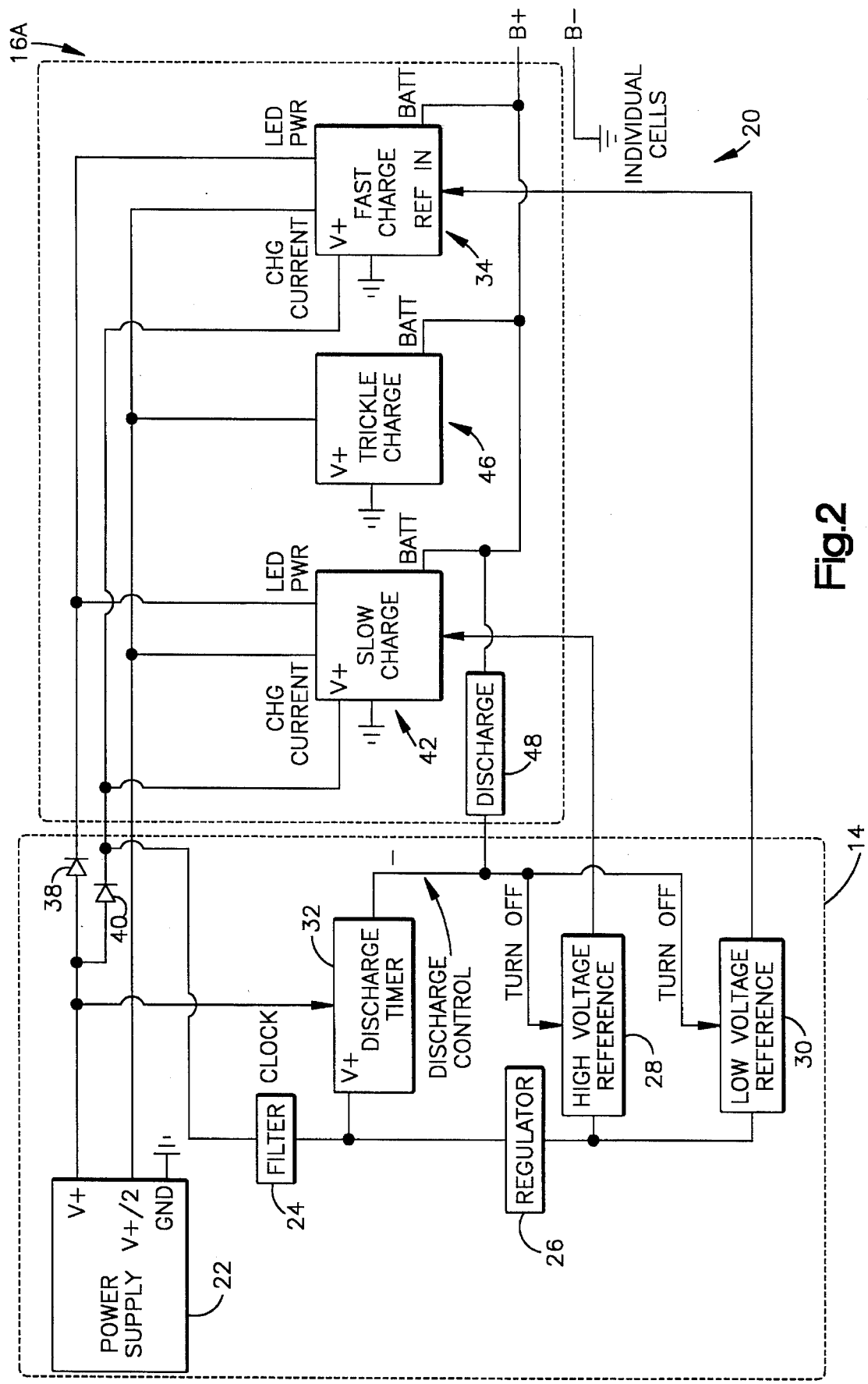
FIG. 2 is a block diagram of an "individually regulated" battery charger in accordance with the invention.
Figure 3:
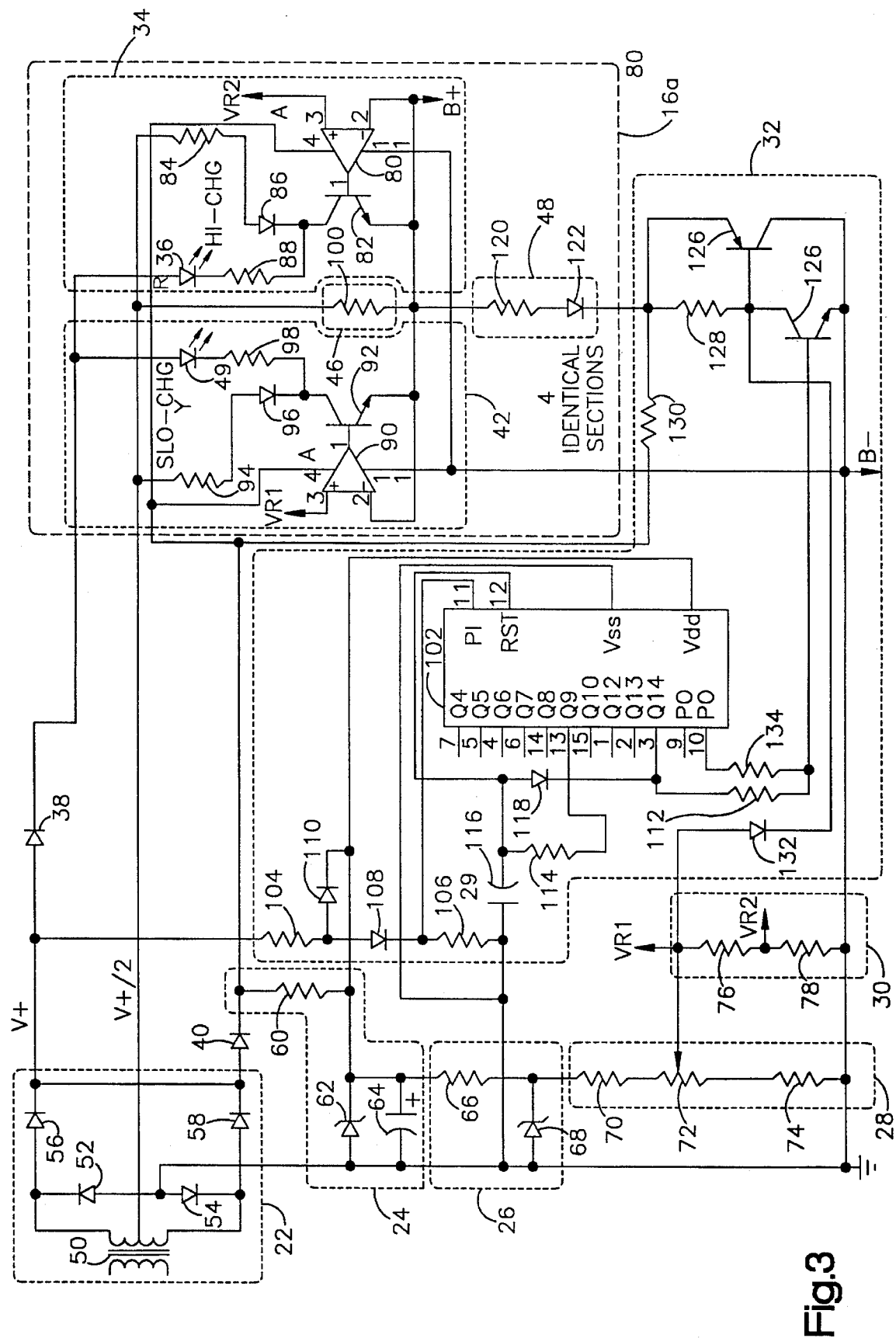
FIG. 3 is a schematic diagram of the "individually regulated" battery charger of FIG. 2.

The disclosed battery charging system 10, as illustrated in FIGS. 1, 2, and 3 charges a plurality of cells, i.e., batteries 12A, 12B, 12C, at or below a voltage at which each battery is unconditionally thermally stable or at or below a voltage (when the battery has a negative temperature coefficient) below which a safe charging current limit is established. The term battery means a plurality of cells and the terms cells and batteries are used interchangeably herein.

Recharging system 10 includes a base unit 14 and a plurality of individual charge control units 16A, 16B, and 16C for each battery 12A, 12B, and 12C (12A–12C), respectively. While the invention is discussed in terms of three batteries, it is within the terms of the invention to use any desired number of batteries and corresponding individual charge control units. The charging system 10 is unique because batteries 12A–12C can be randomly selected from NiCd and/or NiMH batteries. Charging system 10 incorporates a current limit versus battery voltage relationship (with possible temperature coefficient modification) which generally permits either continuously variable, or stepwise variable, i.e. reduced, available recharge current in response to rising battery voltage. The specific choice of the voltage/current/temperature relationship is a primary consideration in the operation of the invention. Furthermore, charging system 10 provides means 18 to adjust the current as a function of time on one or more time scales to further improve battery performance.

To establish the voltage/current/temperature relationship, a first set of voltage/current charge parameters is selected for a sealed NiCd battery and a second set of charge parameters is selected for a NiMH battery of similar size. The two sets of charge parameters are then combined to produce a third set of charge parameters which, while not optimum for either, can effectively charge either the NiCd or the NiMH batteries. A charge time pattern is then established to further modify the third set of charge parameters.

While selecting the voltage/current charge parameters, the inventor has found that NiCd batteries charged up to 1.42 V/cell at 25° C. corresponding to a 40% state-of-charge, exhibit little or no heating, over 90% charge storage efficiency, and no thermal instability for charge currents of up to about 3C. NiCd cells are endothermic for low states of charge and moderate charging currents. Indeed, a NiCd cell can be safely charged by a 1.42 V external source of 3C current capacity until it reaches a 40% state-of-charge equilibrium. Throughout the specification, the "C" or capacity is in accordance with the battery manufacturer's specification.

Above 1.42 V/cell, the charge current for a NiCd cell is tapered to a value between about C/3 to C/10 as the cell voltage increases from 1.42 V/cell to 1.48 V/cell. This decrease in charging current is important because recombinant activity in a NiCd cell causes the cell to give off substantial heat as it approaches 100% of its charge capacity. Moreover, the cell develops a negative temperature coefficient which causes the cell voltage to decrease as the temperature rises. This in turn may cause the charger to deliver more current which further increases the cell temperature and so on. The effect, called "thermal runaway", destroys the cell. A charge current of about C/10 is below the "thermal runaway" limit, and a charge current of about C/10 to about C/20 (depending on cell size) is indefinitely sustainable. A recombinant rate upper limit of C/3 is typical of a sealed NiCd battery. However, a limit of C/10 to C/20 must be imposed on medium size NiCd cells due to limited heat release capacity and a negative temperature coefficient for NiCd cells at the onset of 85% state-of-charge, leading to "thermal runaway" above 95% state-of-charge, if excessive heating is permitted.

To select voltage setpoints for NiMH cells, it is important to take into account that NiMH cells are exothermic at all states-of-charge and have a very small but positive temperature coefficient at all states-of-charge from zero to 100%. The NiMH cell can accept a maximum of about 1C charge current to 85% state-of-charge, corresponding to 1.48 V/cell, with typically over 70% charge storage efficiency. Then the NiMH cell can recombine a charge of current of conservatively C/40. It is noteworthy that capacity of a NiMH cell is typically 1.7 to 2.0 greater than the capacity of a standard NiCd cell of similar size. Therefore, a C/40 limit for a NiMH cell corresponds to C/20 for the smaller capacity of a NiCd cell.

Referring to FIG. 2, there is illustrated a block diagram of a preferred embodiment of an "individual battery regulated"

battery charger 20 which includes a base unit 14 and an individual charge regulator unit 16A. Battery charger 20 recharges battery 12A, being a cell, a battery or group of batteries, with independently controlled charging current based on the state-of-charge of battery 12A, irrespective of batteries 12B and 12C, as shown in FIG. 1. It is understood that any number of charge regulator units will be provided in accordance with the number of batteries 12A–12C being charged.

In operation, battery charger 20 functions based on two preselected reference voltages, VR1 as about 1.48 V and VR2 as about 1.42 V. Note that these reference voltage values are at 25° centigrade and would be adjusted downward for a higher temperature environment and upward for a lower temperature environment. Each battery 12A–12C is charged independent of the other two batteries. For example, if the voltage of battery 12A falls below VR2, battery charger 20 fast-charges battery 12A with a first charging current corresponding to about 1C for a NiMH cell and about 2C for a NiCd cell. When the voltage of battery 12A rises to a value between VR2 and VR1, battery charger 20 slow-charges battery 12A with a second charging current, corresponding to about C/2 for a NiMH cell and about 1C for a NiCd cell. Finally, when the voltage of battery 12A exceeds VR1, it trickle charges battery 12A with a third charging current in the range C/40 for an NiMH cell and C/20 for a NiCd cell. In addition, throughout its operation, battery charger 20 imposes frequent short discharge pulses (typically in the range of one millisecond duration every 8.33 milliseconds for 60 hz operation) and infrequent long discharge pulses (typically 2 second duration every minute) simultaneously to each of the batteries 12A–12C.

Base unit 14, which is a single unit used in conjunction with a plurality of individual charge control units 16A–16B, is described with reference to FIGS. 1–3. A dual power supply 22 provides two supply voltages relative to ground, defined as $V^+$ and $V^+/2$ (typically 10 V and 5 V in this embodiment). $V^+$ and $V^+/2$ are unfiltered, in the form of a full wave-rectified sine-wave, with nodes at 120 Hz. A filter section provides typically 5 VDC. Regulator section 26 further regulates the 5 VDC from filter section 24 to provide typically 3 VDC. Then, high voltage reference section 28 divides the output of regulator section 26 down to a voltage reference VR1, 1.48 V in this example, corresponding to the battery voltage above which battery 12A should be trickle charged. Finally, low voltage reference section 30 divides the output of voltage reference section 28 down to a voltage reference VR2, 1.42 V in this example, corresponding to the battery voltage below which battery 12A can be fast-charged. A time-scheduled discharge section 32 provides frequent short discharge pulses (typically one millisecond duration every 8.33 milliseconds), and infrequent long discharges (typically a two second duration every minute). During discharge, current flows from $B^+$ to ground and discharge control section 32 suspends both fast charge and slow charge to battery 12A by pulling VR1 low which also pulls VR2 low. The logic circuitry of section 32 is powered from filter 24 and its clock input comes from the 120 Hz oscillation of $V^+$. Note that battery 12A is connected across points $B^+$ and $B^-$.

Turning to the individual charge control unit 16A, a fast charge section 34 compares the battery voltage at $B^+$ to VR2. When $B^+$ is less then VR2, fast charge section 34 initiates a fast-charge to battery 12A by letting a relatively large charging current flow, from $V^+/2$ to $B^+$. Simultaneously, the fast-charge is indicated by the lighting of LED 36 powered by $V^+$ through diode 38. The logic circuitry of section 34 is powered by $V^+$ through diode 40. Conversely, when $B^+$ exceeds VR2, fast-charge current is turned off.

A slow charge section 42, incorporated in individual charge control unit 16A, initially compares the battery voltage at $B^+$ to VR1. While $B^+$ is less than VR1, slow charge section provides a slow charging current flow from $V^+/2$ to $B^+$ which is added to the fast charge of from fast charge section 34 and trickle charge from section 46. When $B^+$ is greater than VR2 and less then VR1, battery 12A is slow-charged with a second charging current of slow charging current from slow charge section 42 and trickle current from the trickle section 46. At the same time, section 42 indicates slow-charge by lighting an LED 44 powered by $V^+$ through diode 38. The logic circuitry of slow charge section 42 is powered by $V^+$ through diode 40. When battery 12A is charged to a voltage where $B^+$ exceeds VR1, the slow-charge current is turned off.

A trickle charge section 46 in individual charge control unit 16A continually trickle charges battery 12A with a third charging current which flows from $V^+/2$ to $B^+$ irrespective of the charge in battery 12A.

A discharge section 48 is duplicated for the first, second and third charging sections maintaining the isolation of the three batteries 12A–12C from each other. Accordingly, each of the three batteries 12A–12C is charged by individual charge control unit 16A–16C, respectively, while base unit 14 services batteries 12A–12C simultaneously.

Referring now to FIG. 3, a schematic diagram of the "individually regulated" battery charger 20 of FIG. 2, there is shown an enabling circuit to carry out the invention. Power supply section 22, providing a bipolar output, includes a transformer 50 which provides line voltage isolation and an appropriate center tapped secondary voltage (typically 10 VAC). The AC output of transformer 50 is full-wave rectified by diodes 52, 54, 56, and 58 to provide two output voltages. The most negative output is defined as ground, the most positive output is defined as $V^+$, and the center tap provides $V^+/2$. Both $V^+$ and $V^+/2$ are unfiltered and appear as a full wave, rectified, sinewave with a 120 Hz frequency.

Filter section 24 filters the $V^+$ output of power supply section 22. Current from $V^+$ flowing through resistor 60 is regulated by Zener diode 62 (typically 5 V with almost zero temperature coefficient) and filtered by capacitor 64 to provide a filtered output (typically about 5 VDC).

Regulator section 26 further regulates the aforementioned 5 VDC filtered output down to a regulated voltage output (typically about 3 VDC), via resistor 66 and Zener diode 68 (typically 3 V with negative temperature coefficient). The negative temperature coefficient is significant because it lowers the voltage output in response to increased ambient temperature. This in turn reduces the reference voltages VR1 and VR2 to reduce the cut off voltage of both fast and slow charge current to the batteries, particularly the NiCd batteries, and the risk of thermal runaway. The two Zener diodes 62 and 68 in sequence provide excellent line voltage regulation.

High voltage reference section 28 is a resistor divider comprising resistors 70, 72, and 74. Reference section 28 resistor-divides the regulated voltage output of regulator section 26 to output a voltage reference VR1, which is 1.48 V in this embodiment.

Low voltage reference section 30 is a resistor divider comprising resistors 76 and 78. Reference section 30 resistor-divides VR1 down to a lower reference voltage VR2, which is 1.42 V in this embodiment.

In operation, a battery 12A to be charged is connected between points B⁺ and B⁻. The fast charge section 34, slow charge section 42, and trickle charge section 46 work together to provide charge current that varies with battery voltage. When battery voltage is below 1.42 V, a fast charge current comprising charge currents from the three charge sections delivered to battery 12A. For a 650 AH NiCd cell or a 1.2 AH NiMh cell fast charge section 34 provides fast charge current (typically about 0.8 A); slow charge section 42 provides slow charge current (typically about 200 mA) and trickle charge section 46 provides trickle charge (typically about 25 mA). Then, when battery voltage is between 1.42 V and 1.48 V, the fast charge section 34 turns off and slow charge current flows to the battery from slow charge section 42 and trickle charge section 46. Finally, when battery voltage exceeds 1.48 V, both the fast charge section 34 and the slow charge section 42 are turned off and trickle charge current flows to the battery 12A from trickle charge section 46.

Referring to FIG. 3, a detailed description of the operation of fast charge section 34 operates follows. When the voltage of battery 12A falls below VR2, the output of comparator 80 goes high, turning on transistor 82. Fast charge current flows from the transformer center tap, through current-limiting resistor 84 (limiting current to under 1 amp) and diode 86, and finally into battery 12A at the positive junction B⁺. Simultaneously, current flows through LED 36 (thereby lighting it), current limiting resistor 88 and battery 12A at B⁺. Conversely, when the voltage of battery 12A exceeds VR2, the output of comparator 80 goes low, turning off transistor 82 and turning off the flow of fast charge current.

The slow charge section 42 operates as follows. When the voltage of battery 12A is below VR1, the output of comparator 90 goes high, turning on transistor 92. Slow charge current flows from the transformer center tap through current-limiting resistor 94 (limiting current to typically 200 mA), into diode 96, and finally into battery 12A at the positive junction B⁺. Simultaneously, current flows through LED 44 (thereby lighting it) and current limiting resistor 98, finally into battery 12A at B⁺. Conversely, when cell voltage exceeds VR1, the output of comparator 90 goes low, turning off transistor 92 and turning off the delivery of slow charge current.

The trickle charge section 46 continuously charges battery 12A with current flowing through current limiting resistor 100 (limiting trickle charge to about 25 mA) to junction B⁺, even when the fast-charge section 34 and slow-charge section 42 are turned off.

Charging current (controlled by sections 34, 42 and 46) is taken from the V⁺/2 line instead of the V⁺ line to minimize resistive loss across resistors 84, 94, and 100, respectively. However, current for lighting LEDs 36 and 44 is taken from the V⁺ line to optimize lighting performance.

Diodes 86 and 96 keep LEDs 36 and 44, respectively, from lighting because of backward current flow through resistors 84 and 94, respectively, when transistors 82 and 92, respectively, are turned off.

A discharge section 32 produces discharge pulses separated by varying periods of time. A 120 Hz rectified half sinewave from V⁺ enters the clock input of counter chip 102, such as for example a type 4060 (a 14 stage binary with two sequential input inverters), through the voltage divider comprising resistors 25 and 26. Diodes 108 and 110 provide compensating voltage drops to prevent the clock input to counter 102 from exceeding the positive power supply input by more than a few millivolts. The output of the first sequential inverter, a narrow positive pulse of one millisecond duration centered at the AC line zero crossing, is used to produce a short discharge pulse every 1/120 th second.

Discharge section 32 also generates a long discharge pulse at a selected count of 120 Hz cycles. The long pulse is initiated through resistor 112 and terminates with the reset of counter 102 from a lower count through resistor 114 at a selected number of counts later. Capacitor 29 is a noise filter. Diode 118 inhibits counter reset until discharge commences.

A discharge current path from battery 12A is provided through resistor 120 and diode 122 of network 48. Diode 122 provides a relatively fixed voltage drop-reducing discharge current at low battery voltage. Discharge is controlled by transistor 124, which is driven, in turn, by transistor 126. Resistor 128 provides a base emitter leakage path for transistor 124. Resistor 130 provides a back bias "pull up" for diodes 122 and 132.

Resistor 130 is connected to the same line that powers comparators 80 and 90. Even at AC line zero crossing, this line is maintained at almost the voltage of Zener diode 62 because it is connected to capacitor 64 through resistor 60. Capacitor 64 is large enough, and resistor 60 is conductive enough, to support the current demands of resistor 130 and comparators 80 and 90 during zero crossing. Diode 40 isolates this line during AC line zero-crossing from any current drain through resistors 84 and 94. Similarly, diode 38 removes reverse voltage on LEDs 36 and 44.

A wide variety of discharge intervals and durations can be selected by changing the counter bits to which resistors 112 and 134 the "short pulse" drive are connected. In the illustration of FIG. 3, output Q14 goes positive after about 68 seconds ($2^{13}$ 120 Hz counts), turning on transistors 124 and 126 and making the reset of counter 102 possible through resistor 114 by removing the pull-down through diode 118. About 2.1 seconds later ($2^8$ 120 Hz counts), Q9 goes high, resetting counter 102, terminating the discharge, and the cycle repeats.

During the long pulse discharge, both the fast-charge section 34 and the slow-charge section 42 are turned off because VR1 and VR2 are pulled low by current flowing through diode 132 and transistor 126. This causes comparators 80 and 90 to turn off transistors 82 and 92. Although trickle current still flows through resistor 100, it is zero during part of the AC cycle and small enough to be overcome by the discharge current at other times.

If resistor 120 is selected to provide a discharge current comparable to the current provided by resistor 94, then the overall charging current below 1.48 V will not be significantly affected. Even above 1.48 V, less than a third of the total current will be withdrawn, and a lower value of resistor 100 can be selected to compensate.

Using the setpoints set forth above, a typical charging schedule for NiCd and NiMH batteries can be established for typical operating conditions. Consider the example of a AA-NiCd cell of 650 AH capacity. Assuming a maximum available fast charging current of about 1C for NiMH batteries and 1.6C for NiCd batteries when charging to 1.42 V/cell. A reduced charge current limit is set from about 200 mA (C/2 for NiMH, C/3.75 for NiCd) above 1.42 V/cell and reduced to zero at 1.48 V/cell. Finally, a constant trickle charge current of 25 mA (C/40 for NiMH, C/24 for NiCd) is provided to each battery above 1.48 V/cell. Under these conditions, an AA NiMH cell of 1 AH capacity will reach 40% state-of-charge in about 40 minutes, 85% state-of-charge in under 6 hours and 95% state-of-charge in under 10 hours. An AA NiCd will reach 40% state-of-charge in under 25 minutes, 85% state-of-charge in under 4 hours, and 95% state-of-charge in under 6 hours.

The previous example illustrates that raising the initial charge current is not important but other factors are quite significant. That is, the time required to reach 85% state-of-charge in either case is not especially sensitive to the availability of an initial 1 amp charging current. However, the cost of the system is very sensitive to the peak current capacity. Therefore, unless a specific application places a premium on reaching over 50% state-of-charge in 1 hour, a substantial improvement in cost/performance, rate, size, weight, heat and reliability can be achieved by reducing the initial charging value to perhaps 0.5 amp or less with little overall performance penalty.

An important aspect of the invention is that battery charging system 10 can effectively charge either NiCd or NiMH batteries or even a mixture of both. For the parameters selected, NiMH batteries of varying construction and capacity and a variety of NiCd batteries (standard, high-capacity, high-temperature and high-rate) are interchangeable and can be properly and safely charged, independent of the initial state-of-charge of the battery. Note, however, that a higher initial state-of-charge reduces the time required to charge the battery to substantial capacity. Moreover, a mixed group of batteries may be charged simultaneously with a charging system 10 providing individual battery regulation.

In addition to the selection of the static voltage/current parameters described above, a time-dependent current charge pattern can be imposed. The charge pattern can include a combination of long and short discharge durations. To illustrate, the combination of two superimposed pulse patterns is described directly below. The step load response time constant of both NiCd and NiMH cells at all states-of-charge are sub-millisecond. Therefore, a reverse current discharge of one millisecond duration will establish equilibrium in the discharge direction. NiCd and NiMH cells do not increase charge acceptance with reverse current discharge pulses, unlike lead or alkaline zinc, manganese dioxide systems. However, the reduction in parameter variation from point to point over the cell plates resulting from cell reversal is still an attractive benefit. Generally, any plate locality which charges more efficiently due to lower local resistance, superior morphology, improved transport, or other mechanisms will also discharge more efficiently. Then, the two will tend to cancel, resulting in greater uniformity over the plate surfaces.

Similarly, long duration discharge periods (where current times duration is the effective variable for moderate currents) tend to selectively dissolve asperities, dendrites and other morphological anomalies.

The combination of short discharge pulses injected in the window formed by an AC line zero crossing in an unfiltered system and long discharge pulses appears to enhance the cycle life and float life of batteries being charged. To maintain overall system efficiency, the long discharge pulses are less frequent than the short pulses.

While the above described embodiment of the invention provides an effective means of charging a plurality of independent NiCd and NiMH batteries 12A–12C, it requires a separate individual charge control unit 16A–16C, respectively, for each battery being charged. In some environments, precise battery charging, as accomplished by system 10, may not be required. Under those circumstances, a battery charging system 150 which is capable of charging a series connected group of NiCd and NiMH batteries, as illustrated in FIGS. 4 and 5, maybe adequate.

Accordingly, it is within the terms of the invention to provide an alternative embodiment wherein a battery charging system 150 is adapted to charge a series connected string of NiCd and NiMH batteries 12A–12D. Battery system charger 150, as illustrated in FIGS. 4 and 5, causes charging current to flow equally through all batteries 12A–12D; i.e., the charge rate is not controlled for each battery individually as in the case with battery charging system 10.

The general structure and operation of battery charging system 150 is similar to that of battery charging system 10. The differences between system 10 and system 150 lie in higher voltage/lower current operation. Therefore, portions of the block diagram of FIG. 4 and the circuit diagram of FIG. 5 are discussed to elaborate on the practical difference between battery charging system 10 and battery charging system 150.

Figure 4:
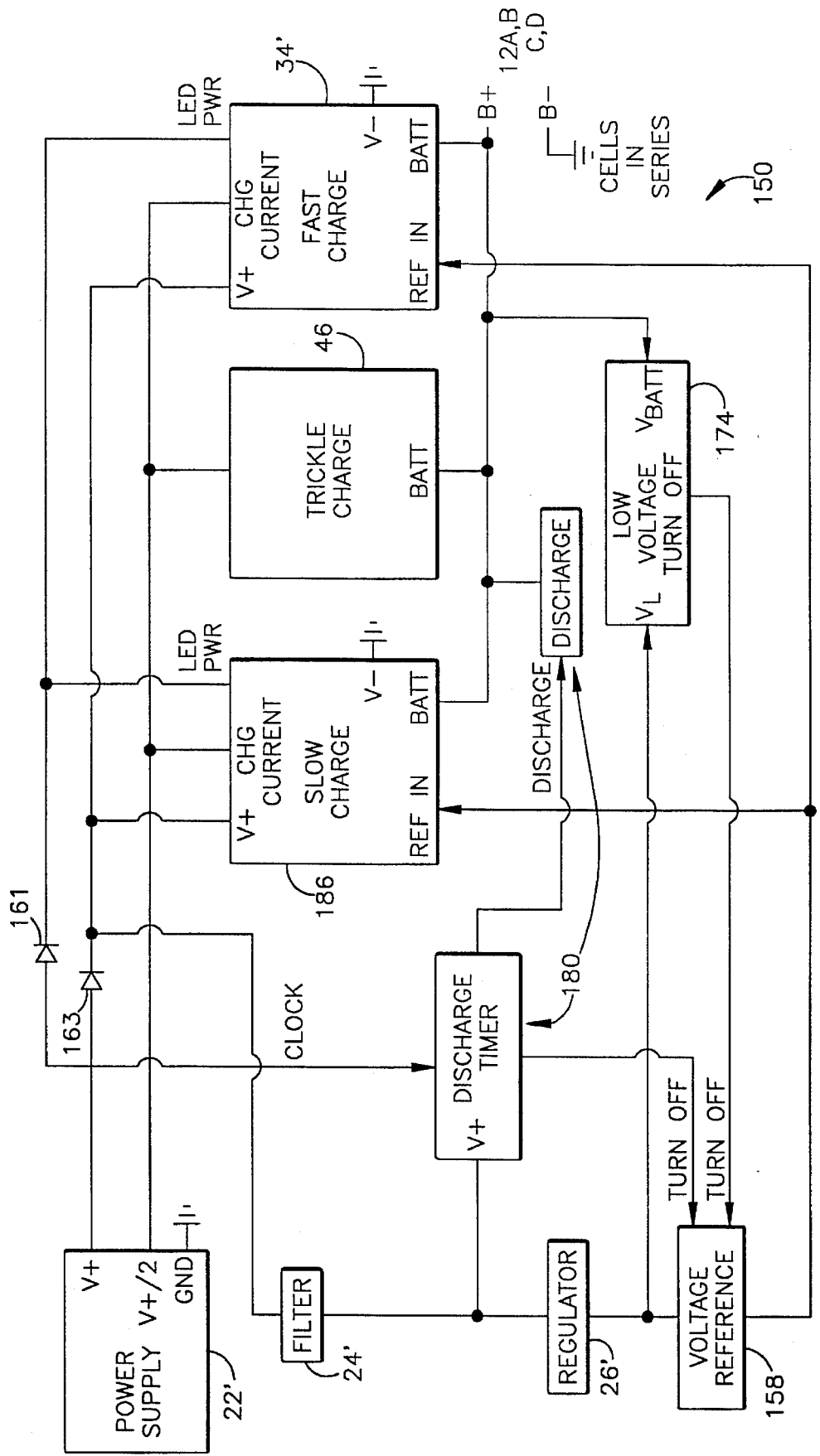
FIG. 4 is a block diagram of a battery charging system for charging a group of serially connected batteries in accordance with the invention.

FIG. 4 is a block diagram of a battery "system" charger 150, defined as a charger in which the charging current flows equally through all cells in the battery or battery system (defined as a string of batteries in series). Charge rate is not controlled for each battery individually as is the case with battery charging system 10.

In operation, battery charging system 150 performs the following functions. When the battery system voltage is below a lower cutoff voltage VR2' (1.40 V, in this embodiment, times the number (N) of batteries in series), system charger 150 fast-charges the string of batteries with a charging current of 1C, typically under 1 amp for small cells. This charging current is a combination of the fast charging current, the slow charging current and the trickle charging current. When the battery system voltage is between VR2' and a higher cutoff voltage VR1' (1.48 V, in this embodiment, times the number of batteries), it slow charges the string of batteries with C/5, typically 200 mA for a 1 AH cell, which is a combination of the slow charging current and the trickle current. When the voltage of the battery string exceeds VR1', it trickle charges the battery with C/40 typically 25 mA. In the previous example, it is assumed that the batteries are NiMH. If, however, NiCd batteries of the same size are substituted, the charge would almost double, i.e. a fast charge would be at nearly 2C.

Also, throughout its operation, battery charging system 150 imposes frequent short discharge pulses (typically one millisecond duration every 1/120 second) and infrequent long discharge pulses (typically 2 second duration every 66 seconds) on the battery system.

Also, if the overall voltage across the string of batteries 12A–12D is below a low reference voltage V.L., typically about 1 V/Cell, only trickle charge flows to the batteries, to prevent excessive current flowing into a battery with one or more very low state-of-charge or shorted cells to protect cells and the charging system.

The general structure and operation of battery charging system 150 is similar to that of battery charging system 10, and the differences between them lie in higher voltage/lower current operation. Therefore, they share identical, or at least corresponding sections, as discussed below.

Dual power supply 22' provides 2 supply voltages relative to ground, defined as V+ and V+/2. V+ and V+/2 are unfiltered, in the form of a full wave rectified half sine-wave, with nodes at 120 Hz. Throughout the specification, primed numbers represent structural elements which are substantially identical to structural elements represented by the same unprimed number.

Filter section 24' regulates and filters V+ to provide typically 5 VDC.

Regulator section 26' further regulates the 5 VDC from filter section 24' down to typically 3 VDC, and also outputs a low voltage reference VL, typically about 4 VDC, whose use is described below.

Voltage reference section 158, corresponding to voltage reference sections 28 and 30 in FIG. 2, divides the output of regulator section 26' down to a voltage reference VR (4×1.40 V=5.60 V), corresponding to the voltage below which the battery system 150 should receive a fast charge current.

Fast charge section 34', compares the voltage of the battery string at $B^+$ to VR1'. When $B^+$ is less then VR1', section 34 directs a fast charge current into the string of batteries by letting a relatively large charging current flow from $V^+/2$ to $B^+$. At the same time, it indicates the fast charge status by lighting an LED powered by $V^+$. The logic circuitry of this section is powered by $V^+$ through diode 163 Conversely, when $B^+$ exceeds VR1' the fast charge current is turned off, leaving only slow charge current and trickle charge current.

Slow charge section 186, corresponding to slow charge section 42 in FIG. 1, compares the battery voltage at $B^+$ to VR1' which this section internally generates from VR. When $B^+$ is less then VR1, this section slow charge current to the string of batteries (with typically 200 mA in this example) by letting a slow charging current flow from $V^+/2$ to $B^+$. At the same time, it indicates the slow charge status by lighting an LED powered by $V^+$ through diode 161. The logic circuitry of section 186 is powered by $V^+$ through diode 163. Conversely, when $B^+$ exceeds VR1' slow charge current is turned off, leaving only trickle charge.

Trickle charge section 46 continually trickle charges the battery string by letting about 25 mA in this example flow from $V^+/2$ to $B^+$.

Discharge timer section 180, corresponding to discharge timer 132 in FIG. 1, provides frequent short discharge pulses (typically one millisecond duration every 1/120 second), and infrequent long discharges (typically 2 seconds duration every 66 seconds). Section 180 discharges the string of batteries by letting current flow from $B^+$ to ground. During discharge, section 180 suspends fast charge and slow charge (by sections 34' and 186, respectively) by pulling VR low. The logic circuitry of section 180 is powered from filter 24'. The clock input comes from the 120 Hz variation of $V^+$.

Low charge turnoff section 174 turns off fast charge and slow charge, leaving only trickle charge current, when battery system voltage is below VL, to prevent excessive current flowing into a battery with one or more very low state-of-charge or shorted cells to prevent damaging charging system 150. It accomplishes this by causing voltage reference section 158 to lower VR, which in turn turns off fast charge section 34' and slow charge section 186.

Referring to FIG. 5, a detailed schematic of the battery charging system 150 shown in FIG. 4, power supply section 22' incorporates a transformer 50' which requires a higher secondary voltage. For example, in the case of four cells 12A–12D in series, a 19 VAC center tap is a practical value, but only about a quarter the current of battery charging system 10 is required.

Regulator section 26' in FIG. 4 is substantially identical to regulator section 26 except that it also outputs a low reference voltage VL, i.e. about 4V, which is tapped from a resistor divider comprising resistors 152 and 154, whose purpose is described later.

Note that voltage reference section 30 is deleted because only a single reference voltage VR is now required.

Voltage reference section 158 is similar to voltage reference section 28 in FIG. 2 except reference section 158 provides a voltage reference, VR of 5.60 V (1.40 V/cell times N where N=4 for four cells) corresponding to VR2 of FIG. 2. The higher voltage reference value required here accounts for the more elaborate circuitry. Since a negative temperature coefficient is still required, a low voltage Zener 68' is employed and the voltage is multiplied up by op amp 160 to the required value. Resistors 162 and 164 control the voltage gain of op amp 160. Resistor 166 guarantees current limiting when the input to op amp 160 is pulled low by diode 170 or 178. Diode 168 assures that the inverting input of op amp 170 will be positive under pull down conditions when the non-inverting input is clamped, to assure a low value to VR. Capacitor 172 is a noise filter.

Low-charge turnoff section 174 turns off both the fast charge and slow charge when the voltage of the battery string is below VL. This feature prevents excessive charge current from flowing into batteries 12A–12D whenever one or more of the batteries has a very low state-of-charge or has shorted cells. Otherwise, charging system 150 could be damaged. When the voltage of the battery string is below VL, the output of comparator 176 goes low, pulling down the input of op amp 160 through diode 178, lowering VR, and turning off the fast charge section 34' and slow charge section 186.

Discharge section 48 has been deleted as a separate section Current limiting resistor 120' which was in discharge section 48, is still required and is combined with the time discharge section 180. Discharge timer 180 is almost identical to discharge timer 32, except for the inclusion of current limiting resistor 120' and the deletion of resistor 130. Resistor 182 and capacitor 184 form a filter.

Slow charge section 186 replaces slow charge section 42 in FIG. 2. Rather than providing two different reference voltages VR1 and VR2 as in FIG. 2, a resistor divider comprising resistors 188 and 190 divides down the battery voltage to accomplish the same effect, i.e., causing comparator 192 to switch at 5.92 V (1.48 V/cell for four cells) instead of 5.60 V as does comparator 194 in fast charge section 34'. Resistor 189 controls the transition current voltage slope from 5.60 V to 5.92 V. Fast charge section 34' is substantially unchanged. The remainder of the circuit operation is similar to FIG. 2.

It is apparent that there has been provided in accordance with this invention apparatus and methods for that satisfy the objects, means and advantages set forth hereinbefore. According to the invention, a battery charging system and method of operating the system is provided which can charge NiCd and/or NiMH batteries (with significant permanent recombinant capacity sufficient to permit cell charge completion, as well as charge maintenance) in an acceptable period.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

We claim:

1. A battery charging system for independently charging NiCd and/or NiMH batteries, comprising:

(a) means for independently charging each of said batteries to a first reference voltage of up to about 1.40 V/cell at a temperature of 25° C. with a fast charging current;

(b) means for independently charging each of said batteries from said reference voltage of about 1.40 V/cell to a second reference voltage of about 1.48 V/cell at a temperature of 25° C. with a slow charging current; and (c) means for independently charging each of said batteries above said second reference voltage with a trickle charging current.

2. The battery charging system of claim 1 including a base unit providing supply voltages and a plurality of individual charge control units, one for each of said plurality of batteries.

3. The battery charging system of claim 2 wherein said individual charge control units provide said fast charging current by adding charging currents from first, second, and third sources of charging current.

4. The battery charging system of claim 3 wherein said individual charge control units provide said slow charging current by adding charging currents from said second and third sources of charging current.

5. The battery charging system of claim 4 wherein said individual charge control units provide said trickle charging current from said third source of charging current.

6. The battery charging system of claim 2 wherein said base unit further includes means to produce short and long discharge pulses independently from each of said batteries, wherein said short and long discharge pulses are separated by varying periods of time.

7. The battery charging system of claim 6 wherein said base unit further includes means for stopping the charging of said batteries with said fast and slow charging currents whenever said discharge pulses are produced from said batteries.

8. The battery charging system of claim 7 wherein said base unit further includes means to vary said first and second reference voltages depending on variations in temperature.

9. A method of independently charging NiCd and/or NiMH batteries, comprising the steps of:

(a) independently charging each of said batteries to a first reference voltage of upto about 1.40 V/cell with a fast charging current;

(b) independently charging each of said batteries from said first reference voltage to a second reference voltage of about 1.48 V/cell with a slow charging current; and (c) independently charging each of said batteries above said second reference voltage with a trickle charging current.

10. The method of claim 9 including the step of adding charging currents from first, second, and third sources of charging current to provide said fast charging current.

11. The method of claim 10 including the step of adding charging currents from second and third sources of charging current to provide said slow charging current.

12. The method of claim 11 including the step of providing said trickle charging current from said third source of charging current.

13. The method of claim 12 including the step of producing short and long discharge pulses separated by varying periods of time from said batteries.

14. The method of claim 13 including the step of stopping said charging of said batteries with said first and second charging currents whenever said discharge pulses are produced from said batteries.

15. A battery charging system for charging a string of serially connected NiCd and/or NiMH cells, comprising:

(a) means for charging said string of cells to a first reference voltage of upto about 1.40 V/cell at a temperature of 25° C. with a fast charging current;

(b) means for independently charging said string of batteries from said voltage of about 1.40 V/cell to a second reference voltage of about 1.48 V/cell at a temperature of 25° C. with a slow charging current; and (c) means for independently charging said string of cells above said second reference voltage with a tickle charging current.

16. The battery charging system of claim 15 further including means for stopping said charging of said string of cells with said fast and slow charging currents whenever said voltage across said string of cells is below a low reference voltage.

17. The battery charging system of claim 16 wherein said fast charging current is the added charging currents from first, second, and third sources of charging current.

18. The battery charging system of claim 17 wherein said slow charging current is the added charging currents from said second and third sources of charging current.

19. The battery charging system of claim 18 wherein said trickle charging current is the charging current from said third source of charging current.

20. The battery charging system of claim 19 further including means to produce short and long discharge pulses from said string of cells, wherein said short and long discharge pulses are separated by varying periods of time.

21. The battery charging system of claim 20 further including means for stopping said charging of said string of cells with said fast and slow charging currents whenever said discharge pulses are produced from said string of cells.

22. The battery charging system of claim 20 further including means to vary said first and second reference voltages depending on variations in temperature.

23. A method of charging a string of serially connected NiCd and/or NiMH cells, comprising the steps of:

(a) charging said string of cells to a first reference voltage of upto about 1.40 V/cell at a temperature of 25° C. with a fast charging current;

(b) charging said string of cells from said voltage of about 1.40 V/cell to a second reference voltage of about 1.48 V/cell at a temperature of 25° C. with a slow charging current; and (c) charging said string of cells above said second reference voltage with a tickle charging current.

24. The method of claim 23 further including the step of charging said string of cells with said fast and slow charging currents whenever said voltage across said string of cells is below a low reference voltage.

25. The method of claim 24 further including the step of providing said fast charging current from the added charging currents from first, second, and third sources of charging current.

26. The method of claim 25 further including the step of providing said slow charging current from the added charging currents of said second and third sources of charging current.

27. The method of claim 26 further including the step of providing said trickle charging current from said third source of charging current.

28. The method of claim 27 further including the step of producing short and long discharge pulses separated by varying periods of time from said string of cells.

29. The method of claim 28 further including the step of stopping said charging of said string of cells with said fast and slow charging currents whenever said discharge pulses are produced from said string of cells.

* * * * *